COLOR OSCILLATOR ARRANGEMENT FOR COLOR RECEIVER

Filed Feb. 16, 1954

Inventor:
John G. Humphrey,
by Donald N. Timbie
His Attorney.

United States Patent Office 2,857,456

Patented Oct. 21, 1958

2,857,456

COLOR OSCILLATOR ARRANGEMENT FOR COLOR RECEIVER

John G. Humphrey, Syracuse, N. Y., assignor to General Electric Company, a corporation of New York Application February 16, 1954, Serial No. 410,600

4 Claims. (Cl. 178—5.4)

In the type of color television system recently disclosed, on pages 90–93 of the August 1951 issue of "Electronics" magazine, brightness information is carried by a video signal just as in the presently standardized monochrome system. Color information is represented by the phase and amplitude of a color carrier lying in the upper end of the video spectrum. These signals may be added together and used to modulate the amplitude of a color carrier, in which event the color carrier is a subcarrier. For present purposes the term color carrier may refer to the subcarrier, the intermediate frequency of the subcarrier or the color carrier as it appears at the output of a second detector. In order to recover the color information, the phase of the color carrier must be compared with an alternating current reference wave of a predetermined and known phase of the color carrier frequency. Such a wave can be supplied by an oscillator that is phase-controlled by a phase synchronizing signal in the form of bursts of alternating current waves that accompany the video signals and the color carrier. However, the color carrier voltage wave present in the receiver may be coupled by stray capacitances in the circuits and tubes into the frequency-determining resonant circuit associated with the oscillator so as to tend to pull the oscillator away from the desired phase that it would otherwise have under the control of the reference signal alone.

Accordingly, it is an object of the present invention to provide phase-controlled oscillator arrangement that is substantially unaffected by the color carrier energy coupled into its resonant circuit.

This objective can be attained in the following manner. The resonant circuit that controls the frequency of the oscillator is tuned to a submultiple of the mean frequency of the color carrier and the required carrier frequency is obtained by multiplying the frequency of the output of the oscillator. The phase of the multiplied output can be compared with the phase of the reference signal so as to derive a voltage for controlling the phase of the oscillator and hence the phase of its multiplied output. In this way any coupling of the color carrier energy into the resonant circuit of the oscillator has very little tendency to pull the oscillator out of phase.

Another way of obtaining this objective is to produce the reference wave of color carrier frequency by providing two oscillators operating at different frequencies. The frequencies may be such that their sum equals the color carrier frequency or they may be such that their difference equals the color carrier frequency. The outputs of the two oscillators are then mixed in such manner as to produce a wave equal in frequency to either the sum or the difference of the frequencies of the outputs of the two oscillators as required. This wave is the reference wave, and its phase is compared with the bursts so as to derive a phase control voltage. Means are provided for adjusting the phase of one of the oscillators in response to the control voltage.

The manner in which this as well as other objectives and advantages may be attained will be better understood after the following description taken in connection with the drawings in which.

Figures 1, 2, 3:
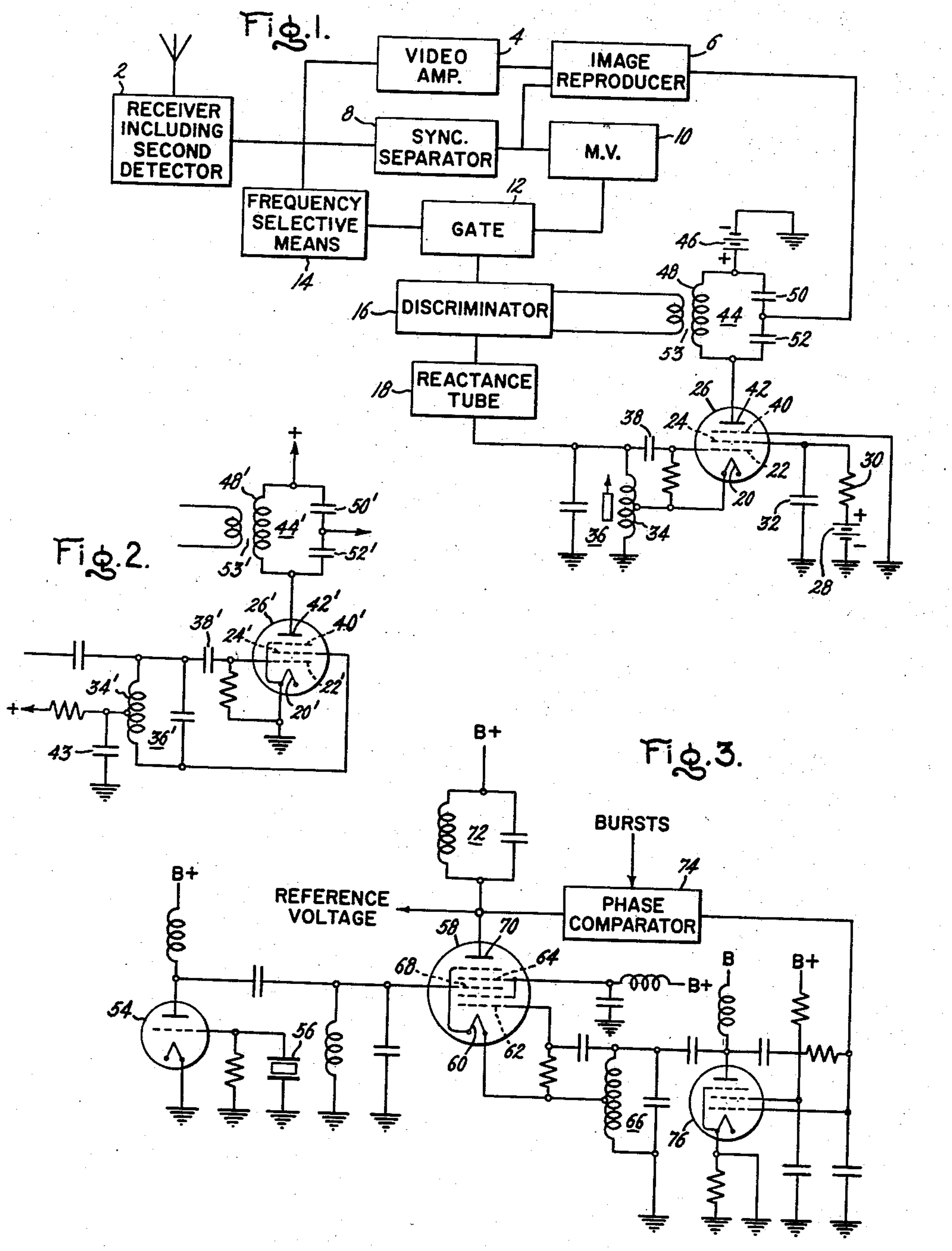
Figure 1 illustrates an embodiment of the principles of this invention wherein the reference wave is provided by an oscillator operating at a submultiple of the color carrier frequency and an harmonic amplifier.
Figure 2 illustrates another type of oscillator and harmonic amplifier that may be substituted for the oscillator and harmonic amplifier of Figure 1.
Figure 3 is a schematic representation of an embodiment of the invention wherein the reference wave is derived by mixing the outputs of two oscillators.

If the various signals are transmitted as an amplitude modulation of a carrier, a suitable receiver 2 may serve to recover the signals. The video signals representing brightness are amplified by a video amplifier 4 and applied to the proper point of any suitable means 6 for reproducing images in color. A synchronizing pulse separator 8 applies the scanning synchronizing signals to the sweep circuits of the image reproducer 6 in the customary manner. The scanning synchronizing signals provided by the sync separator 8 are also applied so as to trigger a monostable multivibrator 10. The time constants of the multivibrator 10 are such that after being triggered to its unstable state by a line synchronizing pulse, it reverts to its stable state before the line blanking period is over. Thus, the multivibrator may provide a pulse suitable for rendering a normally closed gate circuit 12 capable of passing signals during the portion of each line blanking pulse following each line synchronizing pulse. In this particular example it is assumed that the phase synchronizing signal is in the form of a few cycles of a desired phase of the color carrier following each of the line synchronizing pulses. A frequency selective means 14 is tuned so as to pass only the frequency spectrum of the phase synchronizing signal to the gate circuit 12. If the frequency selective means 14 is coupled to the output of the second detector of the receiver, as shown, it is tuned to the video level of the phase synchronizing signal. Therefore, the following discussion will proceed on the basis that the color carrier frequency is at the video level. At this time the gate 12 is rendered capable of passing signals to a phase discriminator 16 by the gating pulse derived from the multivibrator 10 in a manner previously explained.

The color oscillator that is to have its phase controlled by application of the phase control signal supplied by the phase discriminator to a reactance tube 18 may assume many forms. Whatever the form, it is essential to this invention that the oscillator frequency be different from the frequency of the color carrier. It is preferable to limit the operating range of the reactance tube 18 so as to prevent the oscillator from being locked onto a sideband of the bursts. In this particular embodiment of the invention the oscillator amplifier is comprised of a cathode 20, a control grid 22 and a screen grid 24 of an electron tube 26. A battery 28 and a load resistor 30 may serve to apply a proper D. C. potential to the screen grid 24. A capacitor 32 effectively grounds the screen grid 24 for oscillator frequencies. The frequency of oscillation may be set at a submultiple of the frequency of the color carrier by adjusting the value of a variable inductance 34 in a parallel resonant tank circuit 36. In this instance, the tank circuit 36 is resonant at a submultiple of the color carrier frequency. In order to produce oscillations in the space current flowing in the tube 26, one end of the tank circuit 36 is coupled to the control grid 22 by a capacitor 38, the other end is connected to ground and the cathode 20 is connected to a tap on the inductance 34. Both the screen grid 24 and the suppressor grid 40 are effectively at ground potential for oscillator frequencies so that the output of the oscillator just described is electron coupled to the plate. A tank circuit 44, that is resonant at the frequency of the color carrier, is connected between a battery 46 and the plate 42. If the frequency of the oscillator section of the tube 26 is a submultiple of the color carrier frequency, the current passing to the plate 42 has a frequency component which is at the color carrier frequency, and causes the tank circuit 44 to oscillate at its resonant color carrier frequency.

As shown, the tank circuit 44 is made up of two branches, one being an inductance 48 and the other being made up of capacitors 50 and 52 connected in series. A transformer link 53 couples the color carrier frequency voltage of the tank circuit 44 to the discriminator 16 where its phase is compared with the phase of the bursts. The useful output of this oscillatory system may be derived from the junction of the capacitors 50 and 52 and applied to appropriate circuits in the image reproducer 6.

In Figure 2, a slightly different oscillator is illustrated. For convenience components corresponding in function to the oscillator of Figure 1 are indicated by the same numerals primed. The main difference is that the cathode 20' and the center of the inductance 34' are grounded for the oscillator frequencies. A fixed operating voltage for the screen grid 24' is provided by coupling the tap on the inductance 34' to a point of positive potential and bypassing the oscillator energy to ground via a capacitor 43.

It will be apparent to those skilled in the art that the entire phase control circuits just described could be operated at the I. F. or R. F. frequency levels. If operated at the I. F. level, the frequency selective means 14, the tank circuit and the discriminator 16 are tuned to the frequency of the burst and the color carrier as they appear in the I. F. amplifier. The oscillator section of the tube 26 is operated at a submultiple of the frequency. If the phase control circuits are operated at the R. F. level the frequency selective means 14, the tank circuit 44 and the discriminator 16 are tuned to the frequency of the burst and color carrier at the R. F. level. The oscillator section of the tube 26 is operated at a submultiple of their frequency.

The oscillator frequency need not be a submultiple of the color carrier frequency in order to prevent coupling of color carrier frequency energy into the tank circuit 36 from pulling the phase of the oscillator. For example, as shown in Figure 3, an oscillator 54 may be tuned to a frequency $f_1$. Although any type of oscillator could be used, a tuned-grid-tuned-plate type is illustrated. For reasons which will be explained, it is desirable that the oscillator 54 be stabilized by a crystal 56. The output of the oscillator 54 is coupled to means for mixing its output with another frequency $f_2$. In this particular example, the means is a pentagrid converter tube 58 having its cathode 60, control grid 62 and screen grid 64 coupled in a well known manner to a tank circuit 66 so as to produce oscillations of the frequency $f_2$. The output of the oscillator 54 is coupled to the third grid 68 of the pentagrid converter tube 58 so that the current flowing to the plate 70 contains modulations of a frequency $f_1+f_2$ cycles a second and $f_1-f_2$ cycles a second. The frequency $f_1$ of the oscillator 54 and the frequency $f_2$ of the oscillator section of the tube 58 may be selected so that either their sum $f_1+f_2$ or their difference $f_1-f_2$ equals the color carrier frequency. A tank circuit 72, resonant at the color carrier frequency is connected between the plate 70 and B+. The color carrier frequency reference voltage wave thus caused to appear at the plate 70 is coupled to the synchronous detector. In order that its phase and frequency be controlled by the bursts, the plate 70 is coupled to a phase comparator or discriminator 74 that produces a control voltage indicative of the phase difference between the reference wave appearing at the plate 70 and the bursts. The control voltage is applied to a gain control electrode of the reactance tube 76, the tube 76 being coupled across the tank circuit 66. As is well known to those skilled in the art, such an arrangement causes the phase of the oscillator section of the pentagrid converter tube 58 to vary in accordance with the control voltage. This causes a corresponding shift in the phase of the reference wave of color carrier frequency that appears at the plate 70.

If the frequencies $f_1$ and $f_2$ of the oscillator are such that their sum is to equal the color carrier frequency, it is apparent that each of the frequencies of $f_1$ and $f_2$ lie in the same portion of the frequency spectrum as the video signals. However, if the difference between the frequencies $f_1$ and $f_2$ equals the frequency of the color carrier, they may lie above the portion of the frequency spectrum occupied by the video signals. Hence, these frequencies may be so chosen that any coupling of the video signal energy into the resonant circuit of the oscillator 54 and of the oscillator section of the tube 58 will have little or no effect on the phase or frequency of their oscillations.

It will be apparent to one skilled in the art that the circuits of Figure 3 may be operated at the R. F. level, the I. F. level or the video level. If operated at the I. F. or R. F. levels, the sum or difference of the frequencies $f_1$ and $f_2$ of the respective oscillation equals the frequencies of the burst and the color carrier at their corresponding levels. Corresponding changes are made in the tuning of the tuned circuit 72 and the phase comparator or discriminator 74.

While I have illustrated a particular embodiment of my invention, it will of course be understood that I do not wish to be limited thereto since various modifications both in the circuit arrangement and in the instrumentalities may be made, and I contemplate by the appended claims to cover any such modifications as fall within the true spirit and scope of the invention.

What I claim as new and desire to secure by Letters Patent of the United States is:

1. In a television receiver adapted to reproduce images in color from video signals representing intensity and color carriers, the combination of an oscillator adjusted to operate at a submultiple of the color carrier frequency, means for multiplying the frequency of the output of said oscillator so that it equals said color carrier frequency, means for comparing the phase of the output of said multiplying means with a phase synchronizing wave having a desired phase of the color carrier frequency so as to derive a phase control voltage, and means for controlling the phase of said oscillator with the phase control voltage.

2. In an apparatus for reproducing images in color from a composite signal including a video component representing brightness, a subcarrier component representing color and synchronizing components including a phase synchronizing signal indicative of a predetermined phase of the color carrier, the combination of an oscillator operating at a frequency different from the color carrier frequency, means coupled to the output of said oscillator to produce a wave of the color carrier frequency, and means for controlling the phase of said oscillator in accordance with the difference in phase between the wave of color carrier frequency supplied by said first means and said phase synchronizing signal.

3. In an apparatus for reproducing images in color from a composite signal including a video component representing brightness, a color carrier component representing color and synchronizing components including a phase synchronizing signal indicative of a predetermined phase of the color carrier, the combination of an electron discharge device having a cathode, first and second grids and a plate, means for applying a fixed potential to said second grid, a resonant circuit coupled to said cathode and said grids so as to produce oscillations in the amount of current flowing from said cathode toward said plate, said resonant circuit being tuned to a frequency that is a submultiple of the color carrier frequency, a source of fixed potential having positive and negative terminals, a resonant circuit tuned to the frequency of said color carrier, means coupling said latter resonant circuit between said plate and said positive terminal, a phase comparison device coupled so as to receive the phase synchronizing signal and the output of said latter tuned circuit, and means for controlling the phase of said oscillator in accordance with the correction signal provided by said phase comparison device.

4. Apparatus for producing electrical oscillations having a predetermined phase relationship with respect to a phase synchronizing wave of a predetermined frequency comprising, in combination, first and second sources of oscillations, each of said sources having predetermined frequencies, means coupled to said sources for mixing the oscillations provided thereby so as to produce a wave having a frequency approximately equal to the predetermined frequency of said synchronizing wave, phase comparison means having two inputs and an output and adapted to produce a control voltage at said output indicative of the phase relationship between oscillations applied to said two inputs, one of said inputs being adapted to receive the phase synchronizing wave, means for coupling the output of said mixer to the other of said inputs, and means for controlling the phase of said first source of oscillations in accordance with the control voltage provided by said phase comparison means.

References Cited in the file of this patent

UNITED STATES PATENTS

| | | |
|---|---|---|
| 2,399,421 | Artzt | Apr. 30, 1946 |
| 2,428,946 | Somers | Oct. 14, 1947 |
| 2,523,556 | Burrell | Sept. 26, 1950 |
| 2,594,380 | Barton | Apr. 29, 1952 |
| 2,655,556 | Abelson | Oct. 13, 1953 |
| 2,714,132 | Fredendall | July 26, 1955 |
| 2,743,369 | Sands | Apr. 24, 1956 |
| 2,751,430 | Kelly | June 19, 1956 |
| 2,751,431 | Kennedy | June 19, 1956 |
| 2,752,420 | Ehrich | June 26, 1956 |

OTHER REFERENCES

Design Techniques for Color Television Receiver, pages 136–141 of "Electronics" for February 1954.